(12) United States Patent
Fink et al.

(10) Patent No.: US 9,255,303 B2
(45) Date of Patent: *Feb. 9, 2016

(54) METHOD FOR DETERMINING AT LEAST ONE STATE VARIABLE OF AN ELECTRIC ARC FURNACE, AND ELECTRIC ARC FURNACE

(75) Inventors: Dieter Fink, Bubenreuth (DE); Detlef Gerhard, München (DE); Thomas Matschullat, Eckental (DE); Detlef Rieger, Baldham (DE); Reinhard Sesselmann, Eckersdorf (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 586 days.

This patent is subject to a terminal disclaimer.

(21) Appl. No.: 12/862,011

(22) Filed: Aug. 24, 2010

(65) Prior Publication Data

US 2010/0315098 A1    Dec. 16, 2010

Related U.S. Application Data

(63) Continuation of application No. 11/996,020, filed as application No. PCT/EP2006/064156 on Jul. 12, 2006, now abandoned.

(30) Foreign Application Priority Data

Jul. 22, 2005  (DE) .......................... 10 2005 034 379
Jul. 22, 2005  (DE) .......................... 10 2005 034 409

(51) Int. Cl.
*C21C 5/52*  (2006.01)
*F27B 3/28*  (2006.01)
(Continued)

(52) U.S. Cl.
CPC ................ *C21C 5/5211* (2013.01); *F27B 3/28* (2013.01); *F27D 19/00* (2013.01); *C21C 5/4673* (2013.01); *C21C 2005/5288* (2013.01)

(58) Field of Classification Search
CPC .......... H05B 7/144; H05B 7/148; F27B 3/28; F27B 3/085; F27B 3/20; F27D 2099/0021; F27D 21/00; F27D 19/00; F27D 13/002; C21C 5/5211; C21C 5/5217; C21C 5/5294; C21C 5/4673; C21C 5/54; C21C 2005/5288
USPC ........... 373/44, 45, 104, 78, 105, 109, 49, 46, 373/60, 63, 79, 81, 88, 66, 102; 75/10.12, 75/10.13, 386, 375; 266/81, 80, 90, 78; 324/623

See application file for complete search history.

(56) References Cited

U.S. PATENT DOCUMENTS

| | | | |
|---|---|---|---|
| 4,559,630 A | 12/1985 | Maes | 373/93 |
| 5,051,916 A | 9/1991 | Benson | 364/484 |

(Continued)

FOREIGN PATENT DOCUMENTS

| | | | |
|---|---|---|---|
| CA | 2129407 | 2/1995 | C21C 5/52 |
| CN | 1244333 | 2/2000 | H05B 7/144 |

(Continued)

OTHER PUBLICATIONS

English translation the description of Sesselmann et al. (DE 19801295), Jul. 22, 1999.*

(Continued)

*Primary Examiner* — Hung D Nguyen
(74) *Attorney, Agent, or Firm* — Slayden Grubert Beard PLLC

(57) ABSTRACT

In a method for determining a state variable of an electric arc furnace, especially for determining the level of the foamed slag (15) in a furnace, the energy supplied to the furnace is determined with the aid of at least one electric sensor while solid-borne noise is measured in the form of oscillations on the furnace. The state variable is determined by a transfer function which is determined by evaluating the measured oscillations and evaluating measured data of the electric sensor. The state of the foamed slag level can thus be reliably recognized and be monitored over time. The foamed slag level is decisive for the effectiveness with which energy is fed into the furnace. Furthermore, losses caused by radiation are reduced by covering the arc with the foamed slag. The improved measuring method allows the foamed slag level to be automatically controlled or regulated in a reliable manner.

17 Claims, 1 Drawing Sheet

(51) Int. Cl.
*F27D 19/00* (2006.01)
*C21C 5/46* (2006.01)

(56) References Cited

U.S. PATENT DOCUMENTS

| | | | | |
|---|---|---|---|---|
| 5,438,625 | A | 8/1995 | Klippel | 381/96 |
| 5,533,044 | A | 7/1996 | Strebel | 373/104 |
| 5,611,838 | A * | 3/1997 | Fritz et al. | 75/10.38 |
| 6,405,147 | B1 | 6/2002 | Fera | 702/112 |
| 6,793,708 | B1 * | 9/2004 | Jones et al. | 75/312 |
| 6,969,416 | B2 * | 11/2005 | Saucedo | 75/10.12 |
| 2002/0040623 | A1 | 4/2002 | Stemdera et al. | 75/10.12 |
| 2005/0069015 | A1 | 3/2005 | Bogdahn et al. | 373/111 |

FOREIGN PATENT DOCUMENTS

| | | | |
|---|---|---|---|
| DE | 3616344 A1 * | 11/1987 | |
| DE | 19748310 | 12/1998 | C21C 5/52 |
| DE | 19801295 | 7/1999 | F27B 3/28 |
| DE | 102005034409 | 5/2006 | C21C 5/52 |
| EP | 0637634 | 2/1995 | C21C 5/52 |
| EP | 0661910 | 7/1995 | H05B 7/144 |
| JP | 6248321 A | 9/1994 | C21C 1/02 |
| JP | 7310080 | 11/1995 | C10J 3/46 |
| JP | 1123157 | 1/1999 | F27B 3/08 |
| KR | 20030039639 | 5/2003 | G01N 29/00 |
| KR | 20030054416 | 7/2003 | F27B 3/00 |
| SU | 1397499 | 12/1986 | C21C 5/52 |

OTHER PUBLICATIONS

English translation the claims of Sesselmann et al. (DE 19801295), Jul. 22, 1999.*
Russian Office Action, Russian application No. 2008106778, 8 pages, Sep. 23, 2010.
Korean Office Action for Application No. 10 2008 7001819 (14 pages), Nov. 11, 2009.
International Search Report for Application No. PCT/EP2006/064156 (6 pages), Nov. 24, 2006.
Chinese Office Action for Application No. 200680026905 (22 pages), Mar. 6, 2009.

* cited by examiner

METHOD FOR DETERMINING AT LEAST ONE STATE VARIABLE OF AN ELECTRIC ARC FURNACE, AND ELECTRIC ARC FURNACE

CROSS-REFERENCE TO RELATED APPLICATIONS

This application is a Continuation Application of U.S. Ser. No. 11/996,020 filed Jan. 18, 2008 now abandoned, which is a U.S. national stage application of International Application No. PCT/EP2006/064156 filed Jul. 12, 2006, which designates the United States of America, and claims priority to German application number 10 2005 034 409.7 filed Jul. 22, 2005 and German application number 10 2005 034 379.1 filed Jul. 22, 2005, the contents of which are herby incorporated by reference in their entirety.

TECHNICAL FIELD

The invention relates to a method for determining at least one state variable of an electric arc furnace with at least one electrode, wherein the energy supplied to the electric arc furnace is determined with the aid of at least one electric sensor. The invention also relates to an electric arc furnace with a furnace casing and with at least one electrode, wherein a current lead is provided for each electrode.

BACKGROUND

It is known from DE 197 48 310 C1 to predict foamed slag in an electric arc furnace on the basis of feed materials of the electric arc furnace, such as scrap, steel, alloying agents or admixed materials, in combination with the energy supplied to the electric arc furnace. However, it has been found that state variables of the electric arc furnace cannot be determined sufficiently reliably and accurately enough in this way.

SUMMARY

According to an embodiment, an improved determination of state variables of the electric arc furnace can be achieved by a method for determining at least one state variable of an electric arc furnace with at least one electrode, wherein the method comprises the steps of: determining the energy supplied to the electric arc furnace with the aid of at least one electric sensor, measuring structure-borne noise oscillations on the electric arc furnace, and
  determining the at least one state variable with the aid of a transfer function which is determined by evaluation of the measured structure-borne noise oscillations and by evaluation of measured data of the at least one electric sensor.

According to a further embodiment, the level of the foamed slag may be determined as the state variable. According to a further embodiment, structure-borne noise oscillations on the electric arc furnace can be measured with the aid of at least one acceleration sensor. According to a further embodiment, structure-borne noise oscillations which emanate from at least one arc of the at least one electrode of the electric arc furnace can be measured. According to a further embodiment, the transfer function can be determined from an excitation signal and from an output signal, the excitation signal being determined by evaluating measured data of the at least one electric sensor, and the output signal being determined by evaluating the structure-borne noise oscillations measured on the electric arc furnace. According to a further embodiment, a current signal can be measured with the aid of the at least one electric sensor and is used to form the excitation signal. According to a further embodiment, the excitation signal can be formed by squaring the current signal. According to a further embodiment, a voltage signal can be measured with the aid of the at least one electric sensor and is used to form the excitation signal. According to a further embodiment, the excitation signal can be formed by multiplication of the current signal by the voltage signal. According to a further embodiment, the transfer function can be determined by way of a cross-power spectrum. According to a further embodiment, the transfer function can be evaluated at at least one discrete frequency. According to a further embodiment, the at least one discrete frequency may be a multiple of the frequency of the power feed into the arc. According to a further embodiment, the level of the foamed slag can be determined in dependence on the change in the transfer function at the one or more discrete frequencies.

According to another embodiment, a method for controlling an electric arc furnace, may comprise the steps of: determining the energy supplied to the electric arc furnace with the aid of at least one electric sensor, measuring structure-borne noise oscillations on the electric arc furnace, determining the at least one state variable with the aid of a transfer function which is determined by evaluation of the measured structure-borne noise oscillations and by evaluation of measured data of the at least one electric sensor, and determining actuating and/or regulating signals for the electric arc furnace with the aid of the at least one specific state variable.

According to a further embodiment, actuating and/or regulating signals can be emitted to a feeding device of the electric arc furnace. According to a further embodiment, actuating and/or regulating signals that influence the blowing-in of oxygen can be emitted. According to a further embodiment, actuating and/or regulating signals that influence the blowing-in of carbon can be emitted. According to a further embodiment, actuating and/or regulating signals that influence the blowing-in of lime can be emitted. According to a further embodiment, actuating and/or regulating signals for influencing the position of the at least one electrode can be emitted. According to a further embodiment, a neural network may be used for determining the actuating and/or regulating signals.

According to another embodiment, an electric arc furnace may comprise a furnace casing, at least one electrode, a current lead for each electrode, and at least one electric sensor on a current lead and at least one structure-borne noise sensor for sensing structure-borne noise oscillations is provided on the wall of the furnace casing.

According to a further embodiment, an electric sensor can be provided for each electrode. According to a further embodiment, the at least one structure-borne noise sensor may be formed as an acceleration sensor. According to a further embodiment, the electric arc furnace may further comprise a structure-borne noise sensor for each electrode. According to a further embodiment, the one or more structure-borne noise sensors may be arranged on a wall of the furnace casing that is opposite the respective electrode. According to a further embodiment, the at least one electric sensor and the at least one structure-borne noise sensor may be coupled with a signal processing device. According to a further embodiment, the electric arc furnace may comprise at least one optical waveguide for coupling the at least one structure-borne noise sensor with the signal processing device. According to a further embodiment, the at least one structure-borne noise sensor may be connected to the optical waveguide by way of at least one signal line and by way of an optical device arranged ahead of the optical waveguide. According to a further embodiment, the at least one signal line can be formed such that it is routed in a protected manner. According to a further embodiment, the signal processing device may be coupled with a regulating device for the electric arc furnace.

BRIEF DESCRIPTION OF THE DRAWINGS

Further advantages and details of the invention are described below on the basis of examples in conjunction with the drawings, in which.

DETAILED DESCRIPTION

Figure 1:
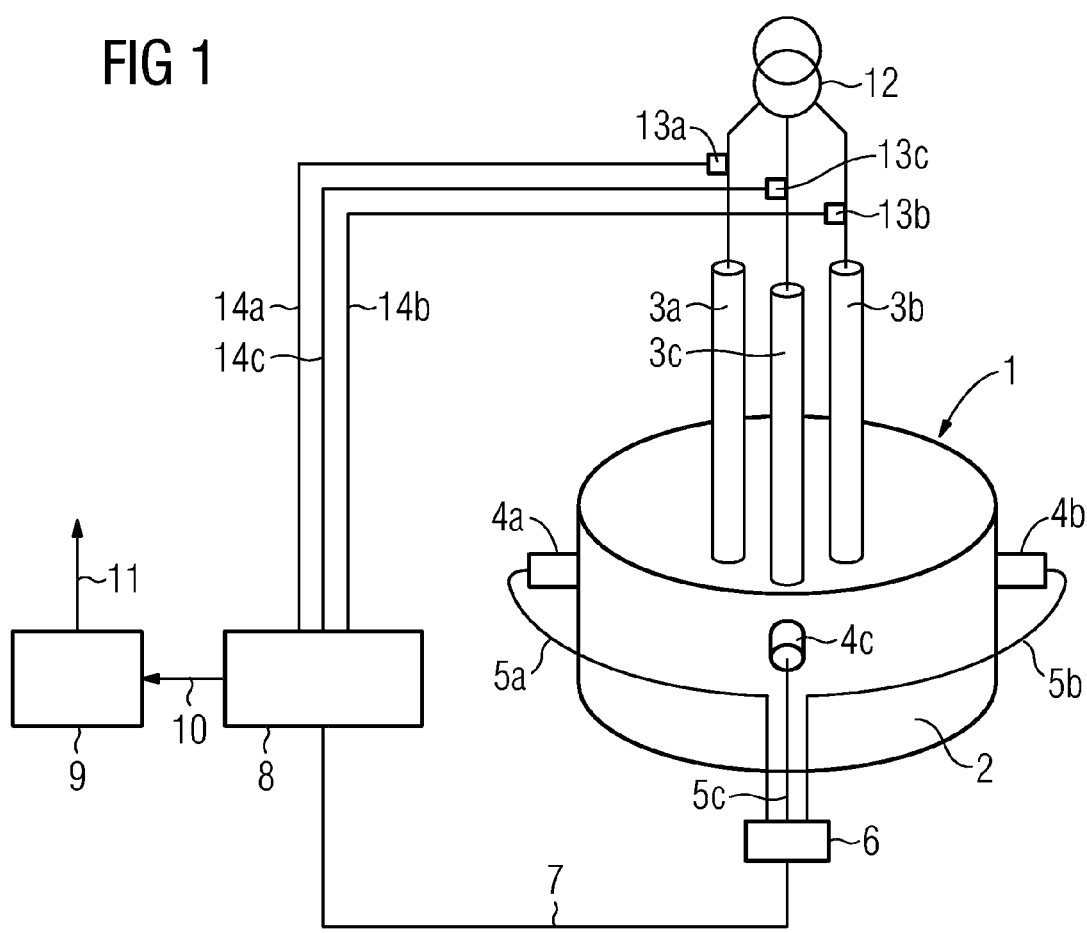
FIG. 1 schematically shows an electric arc furnace according to an embodiment.

As stated above, according to an embodiment, oscillations on the electric arc furnace are measured and the state variable of the electric arc furnace is determined with the aid of a transfer function which is determined by evaluating the measured oscillations and by evaluating measured data of the at least one electric sensor.

State variables of the electric arc furnace, in particular state variables concerning the content of the electric arc furnace, can be determined according to an embodiment very accurately and reliably while the electric arc furnace is in operation, that is to say can be determined online. This satisfies an important prerequisite for improved automatic process control and regulation of the electric arc furnace.

The level of the foamed slag can be advantageously determined as the state variable.

Oscillations, i.e. structure-borne noise, on the electric arc furnace can expediently be measured with the aid of at least one acceleration sensor.

Oscillations, i.e. structure-borne noise, which emanate from an arc of the at least one electrode of the electric arc furnace are advantageously measured.

It may be of advantage to determine the transfer function from an excitation signal and from an output signal, the excitation signal being determined by evaluating measured data of the at least one electric sensor and the output signal being determined by evaluating the oscillations measured on the electric arc furnace.

It may be expedient to measure a current signal with the aid of the at least one electric sensor and use it to form the excitation signal.

According to an embodiment of the method, the excitation signal may be formed by multiplication of the current signal by itself, i.e. by squaring.

A voltage signal may advantageously be measured with the aid of the at least one electric sensor and used to form the excitation signal. If appropriate, the measurement and/or use of the voltage signal is performed as an alternative or in addition to the measurement and use of the current signal.

The excitation signal may advantageously be formed by multiplication of the current signal by the voltage signal.

The transfer function may advantageously be determined by way of a cross-power spectrum.

The transfer function may preferably be evaluated at at least one discrete frequency.

The at least one discrete frequency may advantageously be a multiple of the frequency of the power feed into the arc or into the electric arc furnace.

It may be expedient to determine the level of the foamed slag in dependence on the change in the transfer function at the one or more discrete frequencies.

According to another embodiment, an electric arc furnace comprises a furnace casing and at least one electrode, wherein a current lead is provided for each electrode and, to carry out a method as given above in the various forms it takes, at least one electric sensor is provided on a current lead and at least one structure-borne noise sensor for sensing oscillations is provided on the wall of the furnace casing.

The advantages of the electric arc furnace according to an embodiment are to the greatest extent analogous to the advantages of the method.

An electric sensor may preferably be provided for each electrode.

The at least one structure-borne noise sensor may advantageously be formed as an acceleration sensor.

A structure-borne noise sensor may preferably be provided for each electrode.

The one or more structure-borne noise sensors may advantageously be arranged on a wall of the furnace casing that is opposite the respective electrode.

The at least one electric sensor and the at least one structure-borne noise sensor may advantageously be coupled with a signal processing device.

For coupling the at least one structure-borne noise sensor with the signal processing device, at least one optical waveguide may preferably be provided.

In an advantageous development of the electric arc furnace, the at least one structure-borne noise sensor may be connected to the optical waveguide by way of at least one signal line and by way of an optical device arranged ahead of the optical waveguide.

The at least one signal line may advantageously be routed in a protected manner.

The signal processing device may advantageously be coupled with a regulating device for the electric arc furnace.

FIG. 1 shows an electric arc furnace with a number of electrodes 3a, 3b, 3c, which are coupled with a current supply device 12 by way of current leads. The current supply device 12 preferably has a furnace transformer.

With the aid of at least one electrode, in the example shown three electrodes 3a, 3b, 3c, feed materials, such as for example scrap and/or steel, possibly with alloying agents and/or admixed materials, are melted in the electric arc furnace. When producing steel in the electric arc furnace, slag or foamed slag 15 (see FIG. 2) is formed and is made to foam by blowing in a media mixture, as a means of improving the energy introduced by way of an arc 18 (see FIG. 2), which forms at the at least one electrode 3, 3a, 3b, 3c.

In the example shown, electric sensors 13a, 13b, 13c are provided on the current leads of the electrodes 3a, 3b, 3c and can be used to measure the current and/or voltage or the energy supplied to the electrodes 3a, 3b, 3c. The electric sensors 13a, 13b, 13c are coupled with a signal processing device 8, for example by way of signal lines 14a, 14b, 14c for electric measuring signals, formed as cables.

Arranged on the wall 2 or on the panels of the furnace casing 1, i.e. on the outer delimitation of the furnace casing 1, are structure-borne noise sensors 4a, 4b, 4c for measuring oscillations on the furnace casing 1. The structure-borne noise sensors 4, 4a, 4b, 4c may be arranged such that they are connected indirectly and/or directly to the furnace casing 1 or to the wall 2 of the furnace casing 1.

As indicated in the example shown, the sensors for measuring structure-borne noise, i.e. the structure-borne noise sensors 4, 4a, 4b, 4c, may be arranged on the outer wall of the furnace casing 1. Structure-borne noise sensors 4, 4a, 4b, 4c may, for example, be arranged at equal intervals around the furnace casing 1. In order to increase the accuracy of the structure-borne noise measurements, it may be expedient to provide a structure-borne noise sensor 4a, 4b, 4c respectively for each electrode 3a, 3b, 3c. In this case, the structure-borne noise sensors 4a, 4b, 4c do not necessarily have to be arranged on the outer wall of the furnace casing 1. At least one sensor 4a, 4b, 4c that is assigned to an electrode 3a, 3b, 3c may preferably be arranged at a location at the smallest possible distance from this electrode 3a, 3b, 3c, preferably at a location on the outer wall of the furnace casing 1. The structure-borne noise is passed through the steel bath 16 and/or through the foamed slag 15 to the furnace casing 1 and can be measured indirectly and or directly on the furnace casing 1 in the form of oscillations.

The structure-borne noise sensors 4, 4a, 4b, 4c are connected to the signal processing device 8. The signals that are emitted by the structure-borne noise sensors 4, 4a, 4b, and 4c to the signal processing device 8 are at least partially passed by way of an optical waveguide 7. Arranged between the optical waveguide 7 and the structure-borne noise sensors 4, 4a, 4b, 4c is at least one optical device 6, which serves for amplifying and/or converting signals of the one or more structure-borne noise sensors 4, 4a, 4b, 4c. Signal lines 5, 5a, 5b, 5c, which carry the signals of the structure-borne noise sensors 4a, 4b, 4c, may be provided in close proximity to the furnace casing 1, or under some circumstances even directly on the furnace casing 1. The signal lines 5, 5a, 5b, 5c are preferably routed such that they are protected from heat, electromagnetic fields, mechanical loading and/or other loads.

The electric sensors 13a, 13b, 13c may preferably be connected by way of signal lines 14a, 14b, 14c, which are formed as cables, to the signal processing device 8. In the signal processing device 8, evaluation data are determined from the measuring signals of the structure-borne noise sensors 4, 4a, 4b, 4c and from the measuring signals of the electric sensors 13a, 13b, 13c. The evaluation data relate to at least one state variable of the electric arc furnace, the evaluation data preferably relating to the foamed slag 15 (see FIG. 2) or its level. The signal processing device 8 emits a state signal 10, preferably the currently calculated and/or pre-calculated level of the foamed slag 15, to a regulating device 9 for the electric arc furnace. The state signal 10 at least partially represents the evaluation data. Taking the state signals 10 into account, the regulating device 9 determines regulating signals 11 for the electric arc furnace, for example for controlling the blowing-in of media mixture, the introduction of coal, the introduction of oxygen and/or other substances into the electric arc furnace.

According to an embodiment, regulating signals 11 for controlling or regulating the position or the level of the at least one electrode 3, 3a, 3b, 3c may also be determined. In order to influence the position, in particular the level, of the electrodes 3, 3a, 3b, 3c, one or more control means for controlling the raising or lowering of the electrodes 3, 3a, 3b, 3c are provided and coupled with the regulating device 9.

A control computer, which is not represented any more specifically and with the aid of which the buildup and level of the foamed slag 15 can be controlled or regulated, may be coupled with the electric arc furnace. The control computer emits actuating signals 11, in particular to a feeding device of the electric arc furnace. The control computer may include the signal processing device 8 and/or the regulating device 9. A feeding device of the electric arc furnace may, for example, have a so-called injection lance, with the aid of which carbon, oxygen and/or lime are blown into the electric arc furnace, i.e. into the furnace casing 1 of the electric arc furnace. The substances mentioned above are blown in particular into the foamed slag 15 above the steel bath 16. With the aid of the feeding device, preferably carbon mixed with air is fed into the foamed slag 15. In the foamed slag, the carbon is transformed into carbon dioxide and/or carbon monoxide, so that foamed slag 15 is produced. By blowing in a media mixture with the aid of the feeding device, the introduction of energy by means of the arc 18 (see FIG. 2) is improved. Furthermore, losses through radiation in the electric arc furnace are reduced.

It is possible to measure the concentration of substances, in particular of gases, in the electric arc furnace directly or indirectly or determine such concentrations with the aid of models. The data on the concentration of substances, such as for example carbon, oxygen, carbon dioxide and/or carbon monoxide, are preferably fed to the control computer or the signal processing device and/or the regulating device 9. The fed data can be processed and used for determining regulating signals 11.

In a refinement given by way of example, the electric arc furnace shown in FIG. 1 is formed as a three-phase AC arc furnace. In principle, the invention can be applied to arc furnaces of a wide variety of types, for example also to DC furnaces.

Figure 2:
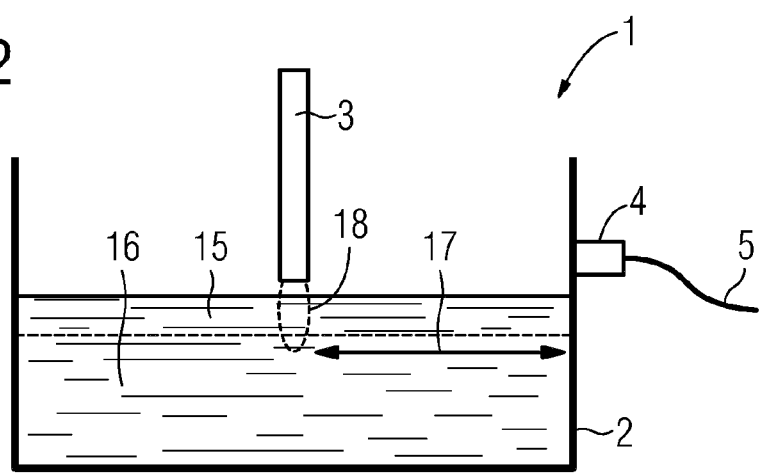
FIG. 2 schematically shows a section through the electric arc furnace.

FIG. 2 shows in a simplified representation an electrode 3, 3a, 3b, 3c with an arc 18 in an electric arc furnace. Arranged on the wall 2 of the furnace casing 1 of the electric arc furnace is a structure-borne noise sensor 4, 4a, 4b, 4c, which is connected to a signal line 5, 5a, 5b, 5c, with the aid of which measuring signals can be passed to a signal processing device 8 (see FIG. 1). The steel bath 16 and the foamed slag 15 in the furnace casing 1 are schematically represented.

The level of the foamed slag 15 can be determined in the signal processing device 8 with the aid of a transfer function of the structure-borne noise in the electric arc furnace. The transfer function characterizes the transfer path 17, schematically indicated in FIG. 2, of the structure-borne noise from excitation to detection.

The excitation of the structure-borne noise takes place by the power feed at the electrodes 3, 3a, 3b, 3c in the arc 18. The structure-borne noise, i.e. the oscillations caused by the excitation, are transferred through the liquid steel bath 16 and/or through the foamed slag 15 that at least partially covers the steel bath 16 to the wall 2 of the electric arc furnace. A transfer of structure-borne noise may additionally also take place, at least partially, through not yet melted feed material in the electric arc furnace. The detection of the structure-borne noise takes place by structure-borne noise sensors 4, 4a, 4b, 4c, which are arranged on the wall 2 of the furnace casing 1 of the electric arc furnace. The structure-borne noise sensors 4, 4a, 4b, 4c pick up oscillations on the walls 2 of the furnace casing 1. The structure-borne noise sensors 4, 4a, 4b, 4c are preferably formed as acceleration sensors. The structure-borne noise sensors 4, 4a, 4b, 4c are preferably provided above the foamed slag zone. Structure-borne noise sensors 4, 4a, 4b, 4c are preferably arranged on the opposite sides of the electrodes 3, 3a, 3b, 3c on the wall 2 of the electric arc furnace.

The electric sensors 13a, 13b, 13c sense current and/or voltage signals of the electrodes 3, 3a, 3b, 3c. Current and/or voltage signals are preferably sensed in a time-resolved manner. The signals of the structure-borne noise sensors are led by way of protected lines 5, 5a, 5b, 5c into an optical device 6 (see FIG. 1). The optical device 6 is preferably arranged relatively close to the actual electric arc furnace. The optical device 6 serves for amplifying and converting the signals of the structure-borne noise sensors 4, 4a, 4b, 4c. In the optical device 6, the signals are converted into optical signals and are passed by way of an optical waveguide 7 free from interference over comparatively longer distances, for example 50 to 200 m, into a signal processing device 8.

In the signal processing device 8, signals are sensed and evaluated. In the signal processing device 8, the signals are preferably digitized at an adequately high sampling rate, for example 6000 samples/second. The excitation signals of the electrodes 3, 3a, 3b, 3c are preferably formed by multiplication of the associated current signals and/or associated voltage signals. The output signals form the structure-borne noise signals. The following applies here to the signals in the time domain:

$$Y(t)=h(t)\cdot X(t), \quad (I)$$

where Y(t) denotes a structure-borne noise signal, X(t) denotes the power feed in the arc 18 and h(t) denotes the step response. The variables h(t) and X(t) are linked to one another by a convolution operator.

The transfer function $\underline{H}(\omega)$ is determined in the frequency domain:

$$\underline{y}(\omega)=\underline{H}(\omega)\cdot \underline{x}(\omega), \quad (II)$$

where $\underline{x}(\omega)$ and $\underline{y}(\omega)$ are the Fourier transforms of the excitation and output signals.

The variables $\underline{x}(\omega)$, $\underline{y}(\omega)$ and $\underline{H}(\omega)$ are complex. To avoid complex division, $\underline{H}(\omega)$ is calculated by way of the cross-power spectrum:

$$|H(\omega)|=|W_{xy}(\omega)|/W_{xx}(\omega), \quad (III)$$

where $W_{xy}(\omega)$ denotes the cross-power spectrum and $W_{xx}$ denotes the power spectrum at the input, i.e. on the side of the excitation.

The transfer function $H(\omega)$ is only determined at discrete frequencies, the discrete frequencies being multiples (harmonics) of the fundamental frequency of the power supply to the electrodes 3, 3a, 3b, 3c, since the excitation only takes place by way of the fundamental wave and the harmonic waves of the coupled power. In the case of a power supply device 12 for the electric arc furnace that operates for example at 50 Hz, the discrete frequencies are multiples of 100 Hz.

The transfer function $H(\omega)$ characterizes the medium in the electric arc furnace. Therefore, the variation of the medium over time, for example the level of the foamed slag 15, can be determined by the change in the transfer function.

The attenuation or amplification of the transfer function values can be used to calculate a resultant value that correlates with the level of the foamed slag 15. This has been confirmed in measuring experiments with a time resolution of about 1 to 2 seconds.

The evaluation in the signal processing device 8 may be adapted with the aid of empirical values from the operation of the electric arc furnace. The signal sensing and evaluation and the slag determination are performed online during operation, so that the state signal that characterizes the slag level in the electric arc furnace can be used for automatically regulating the process. The improved knowledge of the foamed slag process, improved by the measuring techniques according to an embodiment, makes improved process control and regulation possible, leading to the following advantages:

Increase in productivity through higher specific smelting capacity by reducing the downtimes caused in particular by furnace repairs.

Reduction in the specific smelting energy while maintaining a constant tapping temperature.

Reduction in the wearing of the wall by reducing the radiant energy to the inner wall of the furnace casing 1.

Reduction in electrode consumption.

A concept that is important for the invention can be summarized as follows:

The invention relates to a method for determining a state variable of an electric arc furnace, in particular for determining the level of the foamed slag 15 in an electric arc furnace, wherein the energy supplied to the electric arc furnace is determined with the aid of at least one electric sensor 13a, 13b, 13c and wherein structure-borne noise in the form of oscillations on the electric arc furnace is measured, the at least one state variable, in particular the level of the foamed slag 15, being determined with the aid of a transfer function which is determined by evaluating the measured oscillations, i.e. the structure-borne noise, and by evaluating measured data of the at least one electric sensor 13a, 13b, 13c. The state of the level of the foamed slag 15 is in this way reliably detected and monitored over time. The level of the foamed slag 15 is decisive for the effectiveness with which energy is introduced into the electric arc furnace. Moreover, losses through radiation are reduced by covering the arc 18 with the foamed slag 15. The improved measuring method makes it possible for the level of the foamed slag to be automatically controlled or regulated in a reliable manner.

What is claimed is:

1. A method for determining at least one state variable of an electric arc furnace with at least one electrode, comprising:
    supplying energy to the electric arc furnace and determining said energy with the aid of at least one electric sensor,
    measuring structure-borne noise oscillations on the electric arc furnace using at least one noise sensor, wherein the electric arc furnace provides for a transfer path between said at least one electrode and said at least one noise sensor and wherein a transfer function characterizes said transfer path, and
    determining the at least one state variable using the transfer function which is determined from an excitation signal and from an output signal, the excitation signal being determined by evaluating measured data of the at least one electric sensor, and the output signal being determined by evaluating the structure-borne noise oscillations measured on the electric arc furnace, the transfer function being evaluated at discrete frequencies being multiples of a fundamental frequency of the supplied energy to the electric arc furnace,
    wherein the transfer function is determined in the frequency domain where a Fourier transform of the output signal is equal to a product of the transfer function and a Fourier transform of the excitation signal, wherein the absolute value of a cross-power spectrum of the transfer function is equal to the absolute value of the cross-power spectrum at the output signal divided by the cross-power spectrum at the excitation signal.

2. The method according to claim 1, wherein a level of the foamed slag is determined as the state variable.

3. The method according to claim 1, wherein the noise sensor is an acceleration sensor.

4. The method according to claim 1, wherein structure-borne noise oscillations which emanate from at least one arc of the at least one electrode of the electric arc furnace are measured.

5. The method according to claim 1, wherein a current signal is measured with the aid of the at least one electric sensor and is used to form the excitation signal.

6. The method according to claim 5, wherein the excitation, signal is formed by squaring the current signal.

7. The method according to claim 1, wherein a voltage signal is measured with the aid of the at least one electric sensor and is used to form the excitation signal.

8. The method according to claim 7, wherein the excitation signal is formed by multiplication of the current signal by the voltage signal.

9. The method according to claim 1, wherein a level of a foamed slag is determined in dependence on the change in the transfer function at the one or more discrete frequencies.

10. The method according to claim 1, further comprising:
    determining at least one of actuating and regulating signals for the electric arc furnace with the aid of the at least one specific state variable.

11. The method according to claim 10, wherein at least one of actuating and regulating signals are emitted to a feeding device of the electric arc furnace.

12. The method according to claim 10, wherein at least one of actuating and regulating signals are emitted that influence at least one of the blowing-in of oxygen, the blowing-in of carbon, the blowing-in of lime, and the position of the at least one electrode.

13. The method according to claim 10, wherein a neural, network is used for determining the actuating and/or regulating signals.

14. An electric arc furnace comprising:
    a furnace casing,
    at least one electrode,
    a current lead for each electrode,
    at least one electric sensor on at least one of the current leads and at least one structure-borne noise sensor for sensing structure-borne noise oscillations provided on the wall of the furnace casing;
    an evaluation unit receiving signals from said at least one electric sensor and said at least one structure-borne noise sensor and operable to determine at least one state variable using a transfer function which is determined from an excitation signal and from an output signal, the excitation signal being determined by evaluating measured data of the at least one electric sensor, and the output signal being determined by evaluating the structure-borne noise oscillations measured on the electric arc furnace, wherein the transfer function is determined at discrete frequencies being multiples of a fundamental frequency of a supplied energy to the at least one current lead, wherein the transfer function is determined in the frequency domain where a Fourier transform of the output signal is equal to a product of the transfer function and a Fourier transform of the excitation signal, wherein the absolute value of a cross-power spectrum of the transfer function is equal to the absolute value of the cross-power spectrum at the output signal divided by the cross-power spectrum at the excitation signal.

15. The electric arc furnace according to claim 14, wherein an electric sensor is provided for each electrode.

16. The electric arc furnace according to claim 14, wherein the at least one structure-borne noise sensor is formed as an acceleration sensor arranged on a wall of the furnace casing that is opposite the respective electrode.

17. The electric arc furnace according to claim 14, comprising at least one optical waveguide for coupling the at least one structure-borne noise sensor with the evaluation unit, wherein the at least one structure-borne noise sensor is connected to the optical waveguide by way of at least one signal line and by way of an optical device arranged ahead of the optical waveguide.

* * * * *